United States Patent [19]

Saunders

[11] 4,398,530

[45] Aug. 16, 1983

[54] SOLAR COLLECTOR AND HEATING AND COOLING SYSTEM

[76] Inventor: Norman B. Saunders, 15 Ellis Rd., Weston, Mass. 02193

[21] Appl. No.: 218,557

[22] Filed: Dec. 22, 1980

Related U.S. Application Data

[60] Continuation of Ser. No. 766,025, Feb. 7, 1977, abandoned, which is a division of Ser. No. 594,315, Jul. 9, 1975, Pat. No. 4,078,603.

[51] Int. Cl.³ .............................................. F24J 3/02
[52] U.S. Cl. .................................... 126/439; 126/450
[58] Field of Search .............................. 126/438–441, 126/417, 429, 450; 350/259, 260

[56] References Cited

U.S. PATENT DOCUMENTS 3,841,302 10/1974 Falbel .................................. 126/270
3,974,824 8/1976 Smith .............................. 250/228 X
3,990,635 11/1976 Restle et al. ..................... 126/429 X Primary Examiner—William E. Tapolcai
Attorney, Agent, or Firm—Schiller & Pandiscio

[57] ABSTRACT

The invention is directed to a monitoring system for concentrating varying amounts of heat onto a heat transfer fluid and concentrating varying amounts of heat and diffused light into the interior of an enclosed structure. The system comprises a substantially closed unit comprising vertical and horizontal transparent windows and first and second reflectors for directing heat and light into the enclosure during winter months. The system also includes heat absorption means including a trough for transporting a heat transfer fluid between the first window and the trough. The trough includes a heat absorptive surface for absorbing at least some of the heat transmitted through the first window towards the trough and for transmitting from the first window diffused light and heat through the trough into the interior of the enclosed structure.

8 Claims, 5 Drawing Figures

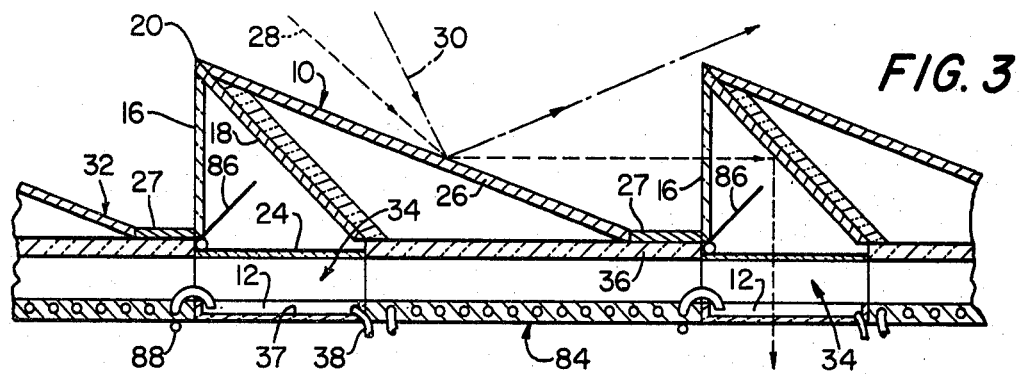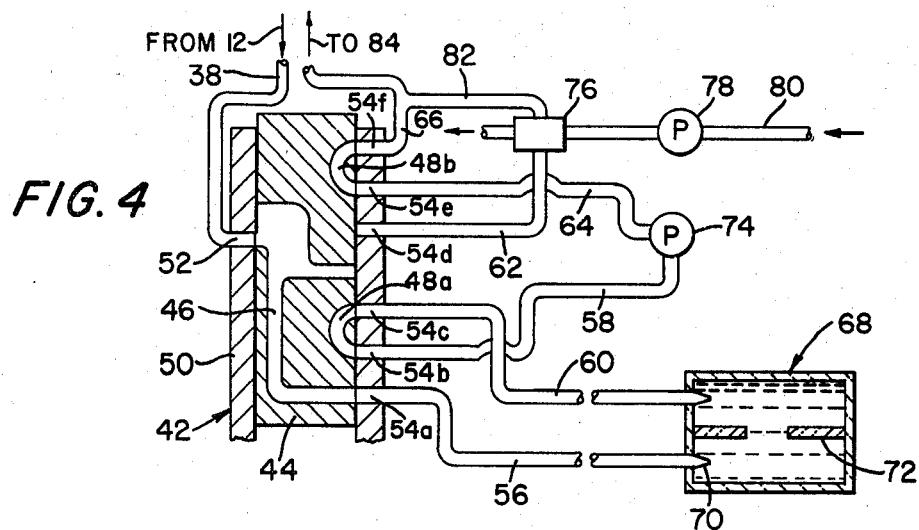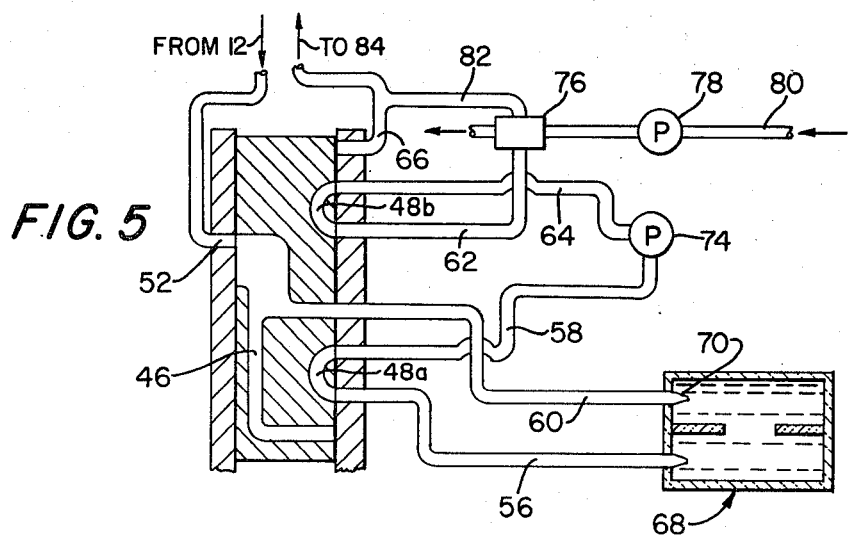

SOLAR COLLECTOR AND HEATING AND COOLING SYSTEM

RELATED APPLICATIONS

This application is a continuation application of my copending application U.S. Ser. No. 766,025 filed Feb. 7, 1977, now abandoned, which in turn is a divisional application of U.S. Ser. No. 594,315 filed July 9, 1975, for Solar Collectors and Heating and Cooling System, now U.S. Pat. No. 4,078,603 issued Mar. 14, 1978.

This invention relates to solar heat control devices which are particularly useful in heating, lighting and ventilating systems and to systems for naturally controlling the temperature, light and humidity within an enclosed structure.

Renewed interest in solar energy has recently developed as a result of increasing costs of energy from conventional resources that are acceptable from an environmental standpoint. Consequently, various solar systems have been developed to harness "insolation" or the radiation received from the sun. Traditionally, these systems are considered to utilize radiation within a wavelength range of 0.3 to 3.0μ which includes most of the solar radiation received. One type of system which is currently of interest includes a solar collector which converts solar heat to a useful energy form by transferring the heat to a heat transfer medium or fluid, typically water or air. Generally, the solar collector comprises means for absorbing the solar heat received before it is transferred to the fluid.

Solar collectors are particularly useful in systems for heating enclosed buildings. Some of these systems include means for storing heat so that the stored heat is availabe when direct solar energy is not. It has been found, however, that the interior room of buildings which are heated by some of these systems can become uncomfortably warm even though heat storage is provided. Thus, many of these systems have limited use and can only be used in cool and cold weather. It is desirable however, to provide a system which can also be used in warm and hot weather in order to cool the interior of the building.

It is therefore a primary object of the present invention to provide a solar heat control device for transferring solar heat to, or diverting it away from a heat transfer fluid depending upon the time of year.

It is another object of the present invention to provide an improved solar heating, cooling and lighting system in which over heating is substantially prevented.

It is another object of the present invention to provide an improved solar heat control system which can easily be converted between a heating system and a cooling system.

These and other objects are achieved by a solar heat control or monitoring device for either concentrating solar heat or diverting heat away from a heat transfer fluid comprising a first reflector, two transparent plates and a second reflector. The geometrical relationship between the reflectors and the plates as well as their orientation with respect to the sun enable the collector to concentrate a greater amount of solar heat on the transfer fluid during the winter months while diverting more of the heat away from the fluid during the summer months. The control device is particularly suited for use in a lighting, heating and cooling system which in turn can be used in an enclosed building. In addition to the control device, the system includes storage means for storing the fluid, heat exchanger means for transferring heat between ventilated air and the fluid, and heat radiation and absorption means for transferring heat between the interior of the building and the fluid. Fluid conducting means interconnect the control device, storage means, the heat exchanger means, and the heat radiation and absorption means so as to define at least two fluid paths. Pump means circulates the fluid through the fluid conducting means, and valve control means are provided for selecting the fluid path of the fluid conducting means.

Other objects of the invention will in part be obvious and will in part appear hereinafter. The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings wherein:

FIG. 3 illustrates a cross-sectional view of a portion of one of two sections of a heating and cooling system incorporating the FIG. 1 embodiment;

FIG. 4 illustrates a partially schematic, partially cross-sectional view of the other section of the system in a first operating mode used with the section shown in FIG. 3; and, FIG. 5 illustrates a partially schematic, partially cross-sectional view of the section of the system described in FIG. 4 in a second operating mode.

In the drawings, the same numerals refer to like parts.

Figure 1:
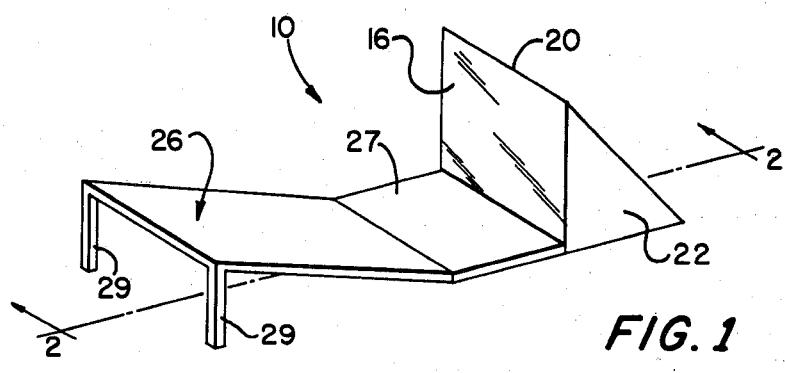
FIG. 1 illustrates a perspective view of a preferred embodiment of the present invention.
Figure 2:
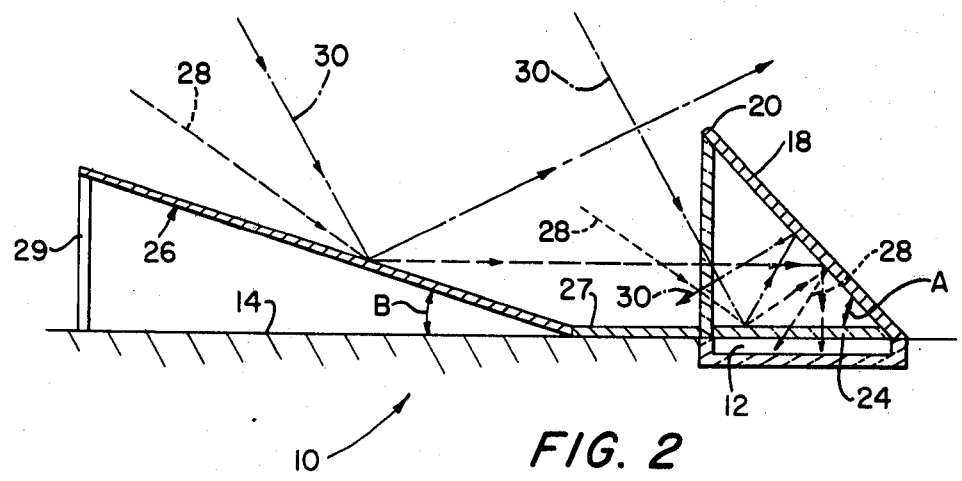
FIG. 2 illustrates a cross-sectional view taken along section line 2—2 of FIG. 1.

Referring to FIGS. 1 and 2, a solar heat monitoring or control device of the present invention, indicated generally at 10 is designed to heat a transfer fluid flowing in a trough 12 either directly or indirectly with solar heat. The device 10 is adapted to transmit or reflect to the trough a greater average amount of solar heat during the winter months than during the summer months. The device is preferably supported on any flat surface 14 and thus is particularly adaptable to be mounted on a building and utilized as a roof top monitor. The device includes a transparent plate or window 16, which is preferably made of a thin high purity glass or other similar material which transmits almost all visible and near infrared energy (i.e. 0.3–3.0μ) but reflects or absorbs middle, far and extreme infrared energy (i.e. radiation greater than 3.0μ). Window 16 is preferably disposed vertically adjacent one edge of the trough (for example, the left hand edge of the opening as shown in FIG. 2). Preferably, the device 10 is positioned so that the plane defined by each window faces equatorially, i.e. when the monitoring device is used in the northern hemisphere, window 16 faces south and when the device is in the southern hemisphere, the window faces north. Window 16 is preferably made of planar glass but can be curved if desired. It is preferably disposed normally to the supporting surface 14 although some variation is permissible (e.g. 10° to 15°). Connected to each window 16 so as to form a triangular configuration, in cross section is a first reflective plate 18, preferably a planar member, typically made of metalized plastic having a polished specularly reflective surface. Reflector 18 has opposite edges thereof, respectively connected to the opposite side of trough 12 and to the top edge of window 16. The apex 20 of the triangular configuration formed therefore extends upwardly from the supporting surface 14. Both sides of the configuration formed by the window 16 and reflector 18 are provided with heat reflective side panels 22 which also are preferably made of metal or metalized plastic and have a specularly reflective surface. The bottom of the triangular configuration is preferably provided with a horizontally-disposed, heat transmitting plate 24 which is sealed over the trough 12 in a manner well known in the art in order to prevent escape of the transfer fluid which flows through trough 12.

Positioned in front of the window 16 is a second reflector 26 and when desired a third reflector 27, both reflectors 26 and 27 preferably but not necessarily being in the form of plane metallic or metalized sheets having a surface which is specularly reflective to both visible and near infrared radiation. The second reflector is spaced from the window 16 and is supported at its front by any suitable constructions such as legs 29 so that the second reflector extends from the top of the supporting legs 29 toward the base of the window 16 directly therebehind. Third reflector 27 is horizontally disposed and extends from the inclined portion 27 to the base of the window 16.

Reflectors 18, 26 and 27 are preferably planar, but can be curved if desired. Reflectors 18 and 26 are inclined with respect to the supporting surface at angles A and B, respectively. The average amount of solar radiation directly reflected off reflector 26 and the average amount of solar radiation which is reflected off the interior surface of reflector 18 is dependent on many factors including the latitude of the site, time of year and the values of angles A and B. (See, for example, *Solar Energy Thermal Processes* by John A. Duffie and William A. Beckman published by John Wiley and Sons, 1974, pp. 21–60 and Saunders, "Radiation in the Atmosphere" and "Sun Angles" published by Norman Saunders, Weston, Massachusetts, 1975). Although angles A and B are not critical, they are oriented to achieve a greater average amount of transmission and reflection of solar radiation to the trough 12 during the winter months than during the summer months. (The path of solar heat with respect to the monitor is indicated by way of example, along line 28 during the winter months and line 30 during summer months since the sun travels across a path which is higher above the horizon during the summer than during the winter). The reflective surface provided by reflector 26 increases the amount of solar radiation provided to the trough 12 during the winter months. This increased radiation is in addition to that transmitted directly through window 16. During the summer months however, the reflective surface of reflector 26 acts as a diverter to divert solar heat away from the window 16 and trough 12. Further, because the change of angle of incidence of the incoming solar radiation and because of internal reflection, some of the heat will be transmitted back out of the control device. Typically, for example, at the latitude of Boston, Massachusetts, A equals approximately 45° while B approximately 20°, although some variation from these angles is permissible (e.g., as much as 15°). It will be appreciated that the angles of plate 24 and reflector 18 are such that as shown a portion of the incoming heat radiation which is directly transmitted through the window 16 onto the plate 24, will be reflected off the plate 24, reflector 18 and out window 16 in summer, while during the winter, because of the lower attitudinal position of the sun, a portion of the heat will be reflected off plate 24 and reflector 18, back to plate 24 to trough 12.

The fluid flowing through trough 12 thus can be heated by solar heat which is transmitted and reflected thereon. The control device therefore can be modified to radiate heat (which is at wavelengths of $3.0\mu$ and longer) from the fluid in the trough, a feature which makes the control device particularly useful in heating, cooling and ventilating systems, such as the one shown in FIGS. 3–5.

Referring to FIGS. 3–5 the control device is used in an enclosed structure, such as a building having a roof 32 exposed to solar radiation. The exposed upper surface of roof 32 is provided with at least one and preferably a plurality of openings 34. The remaining portion of the roof is covered with suitable heat insulation 36 as well known in the art. Each opening 34 is provided with a solar heat control device 10 so that a greater average amount of solar heat is transmitted through opening 34 during the winter season than the summer season. Each opening is thus provided with the transparent window 16 and the reflector 18 which extends from the apex 20 to the opposite side of opening 34. In order to economize space the legs 29 described in FIGS. 1 and 2 which support the second reflector 26 may be omitted by connecting the front edge of reflector 26 to apex 20 of the unit in front of reflector 26. Thus, reflectors 26 and 27 extend from the apex 20 over a first opening 34 to the front of the base of window 16 in the next adjacent opening. It will thus be seen that a double triangular configuration in cross-section is formed in which window 16 is substantially vertical, second and third reflectors 26 and 27 extend from the top of that window 16 to the base of the next window 16 and first reflector 18 lies between window 16 and reflector 26.

Opening 34 is provided with an upper horizontally disposed plate 24 which is transparent to solar radiation, and trough 12 therebelow. Plate 24 is placed in a coplanar relationship with insulation 36 in order to form a continuum of high thermal resistance. Further, one or more additional plates similar to plate 24 can be disposed in a parallel relationship with plate 24 so as to achieve a thermal insulation equivalent to that of insulation 36. The trough comprises a horizontally-disposed surface 37 which is not only heat absorbing as well known in the art, but also light diffusing. Trough 12 functions to transport or carry the flow of the transfer fluid used in the system across opening 34. The trough 12 is in fluid communication at one end to return conduit 38. It has been found from experience that in order to maximize winter heat input to trough 12, the distance between apexes 20 of adjacent solar heat control device units should be approximately four times the height of window 16. The height of window 16 should be at least twice the maximum normally expected snow depth.

In order to control the flow of fluid between at least one of two operating modes, the system is provided with valve control means 42. The latter preferably comprises a valve stem 44 having a central passageway 46 and two diverting passageways 48a and 48b. Control means 42 also includes a valve body 50 having an entrance orifice 52 and a plurality of exit orifices 54a–f. The entrance orifice 52 is connected to return conduit 38, while orifice 54a is connected to first tank pipe 56, orifice 54b to pump input pipe 58, orifice 54c to second tank pipe 60, orifice 54d to heat exchanger feed pipe 62, orifice 54e to pump output pipe 64, orifice 54f to heat absorption and radiation feed pipe 66. Valve stem 44 is slidably movable within body 50 between a first room warming position (shown in FIG. 4) wherein passageway 46 connects return conduit 38 with first tank pipe 56, diverter passageway 48a connects pump input pipe 58 with second tank pipe 60 and diverter passageway 48b connects pump output pipe 64 with heat absorption and radiation feed pipe 66; and a second or room cooling position (shown in FIG. 5) wherein passageway 46 connects entrance orifice 52 with second tank pipe 60, diverter passageway 48a connects first tank pipe 56 with pump feed pipe 58 and diverter passageway 48b connects pump output pipe 64 with heat exchanger feed pipe 62. The movement of stem 44 relative to body 50 may be effected manually, thermostatically controlled, or by any means known to those skilled in the art such as differential temperature controllers strategically placed in trough 12 and the heat storage tank 68.

Tank pipes 56 and 60 are connected respectively to the lower and upper ports of heat storage tank 68 so that they are in fluid communication with the lower and upper ends respectively, of the tank. Preferably, the tank pipes are connected to tank 68 through flat nozzles, shown schematically at 70, in order to maintain thermal stratification of the fluid in the tank. In order to further maintain thermal stratification in the tank, the latter may be provided with thermal insulating baffles 72. Tank 68 is suitably insulated as well known in the art so as to maintain the temperatures of the fluid within the tank without loss of heat.

Pump pipes 58 and 64 are connected respectively to the input and output of fluid pump 74. The latter is any type known in the art, which will pump fluid throughout the system efficiently.

Pipe 62 is connected to a heat exchanger 76. Heat exchangers are well known in the art. Generally, they are devices used to transfer heat from a fluid at a first temperature on one side of a barrier to another fluid at a relatively lower temperature on the other side of the barrier. Exchanger 76 thus provides means for transferring heat between the fluid of the system and the ventilating air which is transferred between the interior and exterior of the structure through exchanger 76. In order to draw air through exchanger 76, reversible or two-way blower or air pump 78 is connected to exchanger 76 by means of air ducts 80. Air pump 78 is operable to either draw air from the interior of the enclosed structure through exchanger 76 and air ducts 80 to the outside, or from the outside through ducts 80 and exchanger 76 to the interior of the structure. The output transfer fluid output of heat exchanger 76 is connected to feed pipe 82.

Pipe 82 is connected to means, shown generally at 84 for radiating heat into the interior of the structure when the temperature of the fluid exceeeds the temperature of the interior of the structure and absorbing heat from the interior of the structure when the temperature in the structure exceeds the temperature of the fluid. Means 84 is preferably a serpentine or sinuous-shaped tubing which extends along the ceiling. It will be appreciated, however, that means 84 may take other forms such as radiator or convection units and may be located at other locations in the enclosed structure such as along the baseboards of the walls. Means 84 empties into trough 12 at the end of the trough opposite return conduit 38.

The end of trough 12 receiving fluid from means 84 is preferably elevated with respect to the opposite end in order to insure free flow.

The fluid utilized in the system may be any type of gas or liquid capable of absorbing heat readily. Typically, the fluid is air or water since such are inexpensive. However, it will be obvious to one skilled in the art that other fluid materials will work equally well. Where the fluid is a liquid it will be apparent that the fluid system forms a gravity return system.

In order to prevent excess heat from being transmitted through opening 34, a shade 86 may be provided above the opening, the shade preferably being reflective to both light and heat. Shade 86 preferably is retractable so that in the retracted position heat and light is transmitted through the opening, while in the extended position, excess light and heat can be prevented from passing through the opening. Although shade 86 is shown preferably arranged so that it is capable of being extended in a substantially perpendicular direction with reflector, it will be understood that the shade 86 will also be effective when extended in any direction so as to prevent passage of excessive light and heat.

Further, when it is desirable to heat the transfer fluid in trough 12 but prevent visible light and/or heat from entering through opening 34, a second retractable shade 88 is provided parallel to and disposed below trough 12. The top surface of the shade which faces trough 12 when the shade is in an extended position is heat and light absorptive to insure maximum heat transfer from the sun to the fluid flowing through trough 12 and that little heat and light is transferred from the fluid to the interior of the building through the surface 37 of the trough. Further, in order to insure little heat loss between the interior of the building and the fluid, the lower surface of the shade which faces the interior of the structure when the shade is drawn is made reflective to the heat inside the structure. (Generally considered to be between 4.0 and $100.0\mu$).

Shades 86 and 88 each include means (not shown) which are well known in the art for extending and retracting the shade with respect to the trough 12.

In operation the lighting, heating and cooling system thus described is designed to cooperate with nature in providing even illumination and even effective temperature. During the day and throughout the seasons, the solar heat control device provides nearly constant light through each opening 34. Any excess light and heat can be throttled off by partially or completely closing shades 86.

In the winter, when it is desirable to heat the interior of the structure, fluid pump 74 is turned on and air pump 78 is operated so that air is drawn from the interior of the building through heat exchanger 76 and ducts 80 to the exterior portion of the building. During the winter months, light and heat will enter along path 28 so that solar radiation is reflected off the top of front reflector 26, off the bottom of reflector 18 through opening 34. The visible portion of this radiation is transmitted through plate 24 and trough 12 while the heat is transmitted through plate 24 and partially absorbed by surface 37. As the fluid flows over surface 37, it absorbs some of the heat from the surface. The fluid flows from trough 12, through pipe 38 and then through valve means 42. During the winter, when it is desirable to heat the interior of the building, valve means 42 is placed in its first position as shown in FIG. 4. The return fluid thus flows through the passage way 46 of control valve means 42 through tank pipe 56 to the bottom of tank 68. As will be seen, as a result of thermal stratification the warmest fluid will be present for the most part at the upper end of the tank. The fluid at the top of tank 68 is forced out of the tank through pipe 60, passageway 48a and thence through pipe 58 to fluid pump 74. The fluid pump forces the fluid through pipe 64, through passageway 48b and thence through pipe 66 into the heat radiation and absorption means 84. Since the entering fluid is at a relative temperature greater than the interior temperature of the enclosed building, as the fluid flows through means 84, heat is transferred to the interior air of the room. As the fluid exits means 84 into trough 12 it will be approximately at the same temperature as the interior air of the building. The fluid then flows through the trough whereupon it is recirculated through the system again.

On a cold winter night, when it is desirable to obtain heat from the system, the system can continue to operate so long as fluid drawn from the top of tank 68 is at a temperature above the interior air temperature. In order to reduce any heat loss from the fluid through opening 34, shades 88 can be extended. It should be noted that the cooler fluid will now be fed into the bottom of tank 68. It will be appreciated that in the room warming position extracted heat from the fluid heats the enclosed building without the expense or complication of a heat pump.

During the winter, at times of large sun power input when the desired temperature is maintained and to avoid overheating within the building, valve means 42 is moved either manually or automatically, to its second or room cooling position as shown in FIG. 5 and air pump 78 may be turned on so that air is drawn from the interior of the enclosed structure, through heat exchanger means 76 and ducts 80 to the exterior of the structure. The fluid will thus flow from trough 12, through the passageway 46 of valve control means 42, through tank pipe 60 to the top of tank 68. The fluid at the bottom of tank 62 is thus forced through pipe 56 through passageway 48a and pipe 58 whereupon fluid pump 74 forces the fluid through pipe 64, passageway 48b and pipe 62 to heat exchanger means 76. When, as in the winter, the fluid from the bottom is cooler than the interior air, heat will be transferred from the exiting air to the fluid as it flows through heat exchanger means 76. Thus, a portion of the heat which is present in the exiting ventilation is recovered. The fluid therefore which leaves heat exchanger 76 is close to room temperature and thus when it flows through heat radiation and absorption means little heat transfer will occur.

In the summer, the path of the incident solar radiation is along path 30. Thus, the amount of solar radiation projected onto the bottom surface of reflector 18 is reduced and considerably less heat will be transmitted through opening 34. Further, valve control means 42 is placed in FIG. 5 position and air pump 78 is operated so that exterior air is transmitted from the outside of the building, through ducts 80 and heat exchanger means 76 into the interior portion of the building. As the fluid flows through heat exchanger means 76, and the incoming air is at a higher temperature than the fluid, heat is transferred from the air to the fluid in heat exchanger means 76. Further, heat exchanger means 76 removes possible condensation from the incoming air during the summer.

The invention thus described is an inexpensive lighting and convertible heating and cooling system which can be used entirely by itself or as an auxilliary system with known heating and cooling systems.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A monitoring system for concentrating varying amounts of heat onto a heat absorptive fluid and varying amounts of heat and diffused light into a predetermined area of the interior of an enclosed structure, said system comprising, in combination:

at least one substantially closed unit adapted to be mounted on the top of said enclosed structure, said unit comprising a first substantially transparent planar window transparent to said heat and light and having a front, rear and side edges, said first window being adapted to be positioned in a substantially horizontal plane above said predetermined area; a second substantially planar window transparent to said heat and light and having bottom, top and side edges, said bottom edge of said second window being adjacent said front edge of said first window, said second window extending in a plane substantially normal to the plane of said first window so that said second window extends above said first window when said first window is positioned substantially horizontally above said predetermined area; a first relector having a top, bottom and side edges, said top edge of said first reflector being adjacent said top edge of said second window, and said bottom edge of said first reflector being adjacent said rear edge of said first window so as to reflect to said first window solar radiation transmitted through said second window toward said first reflector; and side reflectors disposed on the sides of said unit adjacent the side edges of said first and second windows and said first reflector; and a second reflector positioned on the side of said second window opposite said first reflector for reflecting solar radiation along a path which varies according to the altitude and azimuth of the sun when the mean plane of said second window is disposed substantially vertically and faces equatorially so that solar radiation reflected by said second reflector is directed through said second window at average winter altitudes of the sun and is directed away from said second window at average summer altitudes of the sun; and fluid transport means including a trough positioned adjacent said first window in said predetermined area for transporting a heat absorptive fluid between said first window and said trough so that said fluid can absorb heat directed through said first window into said predetermined area, said trough including a surface for transmitting from said first window diffused light and heat through said trough into the interior of the enclosed structure.

2. A monitoring system according to claim 1, further including a third reflector extending from said second reflector to the bottom edge of said second window.

3. A monitoring system according to claim 1, further including means for regulating the amount of heat and light transmitted into the interior of said enclosure.

4. A monitoring system according to claim 3, wherein said means for regulating includes a retractable shade reflective to heat and light.

5. A monitoring system according to claim 4, wherein said shade is movable between a retracted position wherein heat and light are transmitted through said first and second windows and through said trough, and an extended position wherein said shade extends between said first and second windows and reflects heat and light away from said first window towards said second window.

6. A monitoring system according to claim 4, wherein said shade is movable between a retracted position wherein heat and light are transmitted through said first and second windows and through said trough, and an extended position wherein heat and light transmitted through said trough from said first window is reflected back toward said first window.

7. A monitoring system according to claim 1, further including a second one of said substantially closed units having said first and second windows and said first and second reflectors oriented in an identical manner to the corresponding elements of said at least one unit, wherein said second reflector of one of said units has an edge farthest from the second window of the unit supported by the other of said units.

8. A monitoring system according to claim 7, wherein said farthest edge of said one unit is secured to the top edge of the second window of the other unit.

* * * * *

UNITED STATES PATENT AND TRADEMARK OFFICE
CERTIFICATE OF CORRECTION

PATENT NO. : 4,398,530
DATED : August 16, 1983
INVENTOR(S) : Norman B. Saunders

It is certified that error appears in the above-identified patent and that said Letters Patent is hereby corrected as shown below:

Column 8, claim 1, line 32, "relector" should be "reflector".

Signed and Sealed this

First Day of November 1983

[SEAL]

Attest:

*Attesting Officer*

GERALD J. MOSSINGHOFF

*Commissioner of Patents and Trademarks*